United States Patent
Sun et al.

(10) Patent No.: US 9,917,437 B2
(45) Date of Patent: Mar. 13, 2018

(54) HOT SWAP CONTROLLER WITH INDIVIDUALLY CONTROLLED PARALLEL CURRENT PATHS

(71) Applicant: Cisco Technology, Inc., San Jose, CA (US)

(72) Inventors: Yang Sun, Hangzhou (CN); Zhongmin Gan, Shanghai (CN); Bruce Chen, Shanghai (CN); Yun Bai, Shanghai (CN); Nan Wang, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 372 days.

(21) Appl. No.: 14/705,489

(22) Filed: May 6, 2015

(65) Prior Publication Data

US 2016/0329702 A1    Nov. 10, 2016

(51) Int. Cl.
*H02H 9/02* (2006.01)
*H02H 9/00* (2006.01)

(52) U.S. Cl.
CPC .................... *H02H 9/004* (2013.01)

(58) Field of Classification Search
CPC ................. H02H 9/004; H02H 9/02
USPC .......................................... 361/93.9
See application file for complete search history.

(56) References Cited

U.S. PATENT DOCUMENTS

| | | | | |
|---|---|---|---|---|
| 5,351,162 A | * | 9/1994 | Koishikawa | H03K 17/08122 307/39 |
| 2013/0257062 A1 | * | 10/2013 | Sakakibara | F02N 11/087 290/38 R |
| 2014/0015488 A1 | * | 1/2014 | Despesse | H01M 10/425 320/122 |
| 2015/0016005 A1 | * | 1/2015 | Simonson | H02H 9/025 361/93.9 |
| 2016/0226241 A1 | * | 8/2016 | Dix | H02H 9/004 |

OTHER PUBLICATIONS

"Hot Swap Controller and Digital Power and Energy Monitor with PMBus Interface", Analog Devices, Data Sheet ADM1278, Mar. 2015, www.analog.com, 61 pages.
Paul O'Sullivan, "ADM1278 Design Guide", Analog Devices, AN-1338 Application Note, Mar. 2015, www.analog.com, 4 pages.
(Continued)

*Primary Examiner* — Thienvu Tran
*Assistant Examiner* — Kevin J Comber
(74) *Attorney, Agent, or Firm* — Edell, Shapiro & Finnan, LLC

(57) ABSTRACT

An apparatus comprises an input node, a power rail to power a circuit load, and multiple current paths coupled in parallel with each other between the input node and the power rail. Each current path respectively provides a sense output to indicate current in the path and a current switch having a control input to control the current in the path. A control circuit, coupled to each control input individually and to each sense output individually, controls the current in each path individually based on the indicated current therein after a non-zero input voltage is initially applied to the input node, such that all of the paths concurrently conduct current from the input node to the power rail and collectively cause a total inrush current and corresponding voltage at the power rail to gradually increase.

20 Claims, 9 Drawing Sheets

(56) References Cited

OTHER PUBLICATIONS

"Current Sensing Power MOSFETs", Application Note, Publication Order No. AND8093D, Semiconductor Components Industries, LLC, Jul. 2002—Rev. 5, http://onsemi.com, 12 pages.

"SENSEFET Current Monitor for 0.9 V-1.5 V Bus", Publication Order Number: CAT2300/D, Semiconductor Components Industries, LLC, Nov. 2012—Rev. 2, http://onsemi.com, 7 pages.

Mitchell Lee, "AdvancedTCA Hot Swap Controller Monitors Power Distribution", Design Note 397, Linear Technology Corporation, Design Notes, Mar. 2015, www.linear.com, 2 pages.

Vladimir Ostrerov, "Hot Swap Solution Meets AMC and MicroTCA Standards", Design Note 437, Linear Technology Corporation, Design Notes, Mar. 2015, www.linear.com, 2 pages.

"System Power Management and Protection IC with PMBus", LM25066A, Texas Instruments Incorporated, SNVS700F—Dec. 2010—Revised Feb. 2013, www.ti.com, 58 pages.

"SENSEFET Power MOSFET 30 V, 156 A, Single N-Channel, SO-8 FL", Publication Order No. NTMFS4833NS/D, Semiconductor Components Industries, LLC, May 2012—Rev. 1, http://onsemi.com, 7 pages.

Artern Rogachev, "Robust Hot Swap Design", Application Report SLVA673—Nov. 2014, Texas Instruments Incorporated, 20 pages.

\* cited by examiner

HOT SWAP CONTROLLER WITH INDIVIDUALLY CONTROLLED PARALLEL CURRENT PATHS

TECHNICAL FIELD

The present disclosure relates to hot swap controllers.

BACKGROUND

A hot swap controller is an integrated circuit on a circuit board to limit inrush current and power to sensitive circuits also on the circuit board when the circuit board is initially inserted into a "live" chassis backplane, or any other "hot" power source. Normally the hot swap controller monitors input voltage and limits inrush current by adjusting gate voltages of metal oxide semiconductor field effect transistors (MOSFETs). A hot swap controller on a circuit board that consumes high current and associated power may include multiple MOSFETs to handle a correspondingly large inrush current. Conventional hot swap controllers do not provide sufficient individual control of the MOSFETS to account for significant operational variations between the MOSFETs due to, e.g., manufacturing tolerances, process variations, and the like. As a result, circuit designers are forced to overdesign hot swap controllers to account for worst case operational scenarios, which results in added cost and operational inefficiency.

DESCRIPTION OF EXAMPLE EMBODIMENTS

Overview

A hot swap controller comprises an input node, a power rail to power a circuit load, and multiple current paths coupled in parallel with each other between the input node and the power rail. Each current path respectively provides a sense output to indicate current in the path and a current switch having a control input to control the current in the path. A control circuit, coupled to each control input individually and to each sense output individually, controls the current in each path individually based on the indicated current therein after a non-zero input voltage is initially applied to the input node, such that all of the paths concurrently conduct current from the input node to the power rail and collectively cause a total inrush current and corresponding voltage at the power rail to gradually increase.

DETAILED DESCRIPTION

Figure 1:
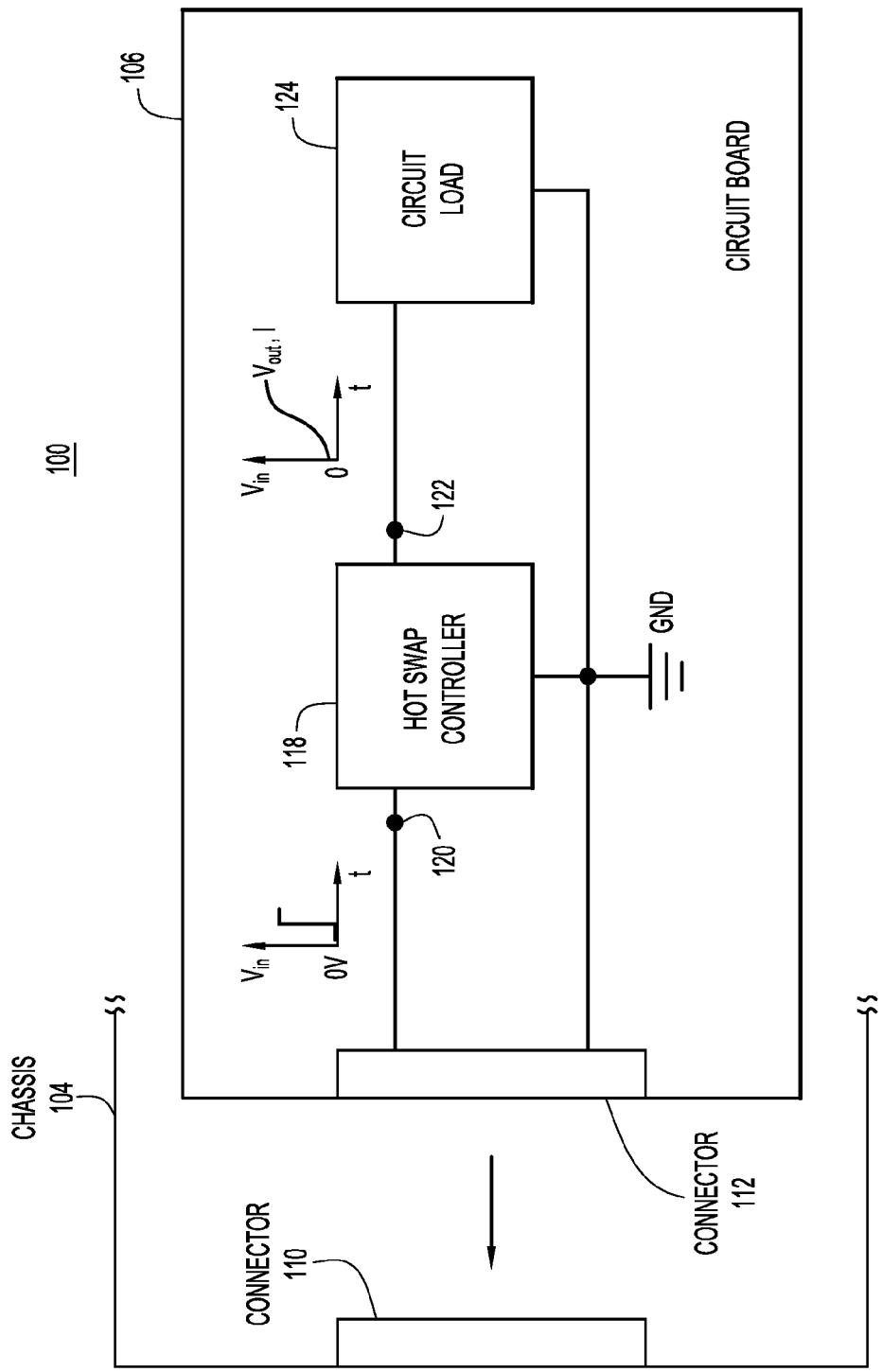
FIG. 1 is an environment in which a hot swap controller may be implemented, according to an example embodiment.

With reference to FIG. 1, there is shown a schematic diagram of an example environment 100 in which embodiments of a hot swap controller may be implemented. Environment 100 includes a server chassis 104 and a circuit board 106. Server chassis 104 includes a chassis connector 110 having pins that carry signals and a power voltage Vin (e.g., 12 Volts (V)), when the chassis is "live" or "hot." Circuit board 106 includes a circuit board connector 112 to mate with chassis connector 110 when the circuit board is inserted into the chassis. Circuit board 106 includes a hot swap controller 118 coupled between an input node 120 and an output node or power rail 122 coupled to circuitry 124 (i.e., a circuit load 124).

If circuit board 106 is plugged into chassis 104 when live, mated connectors 110 and 112 apply non-zero power voltage Vin to input node 120. As a result, input node 120 receives a relatively instantaneous voltage step from zero volts to Vin. Responsive to the relatively instantaneous step-up in voltage to Vin at input node 120, hot swap controller 118 gradually increases or ramps-up current flow from input node 120 to power rail 122 in a controlled manner to thereby correspondingly gradually increase a voltage Vout of power rail 122 from zero volts to near Vin. The gradual increase in current flow and voltage Vout at power terminal 122 gradually powers-on circuitry 124 and thus protects the circuitry from excessive inrush current and initial voltage spikes that would otherwise ensue immediately after the plug-in of circuit board 106 in the absence of intermediate hot swap controller 118. In addition to controlling the inrush current as just described, hot swap controller 118 may also act as an electrical fuse or short circuit protector after the inrush current has settled to a steady state level. Several embodiments of hot swap controller 118 are described below.

Figure 2:
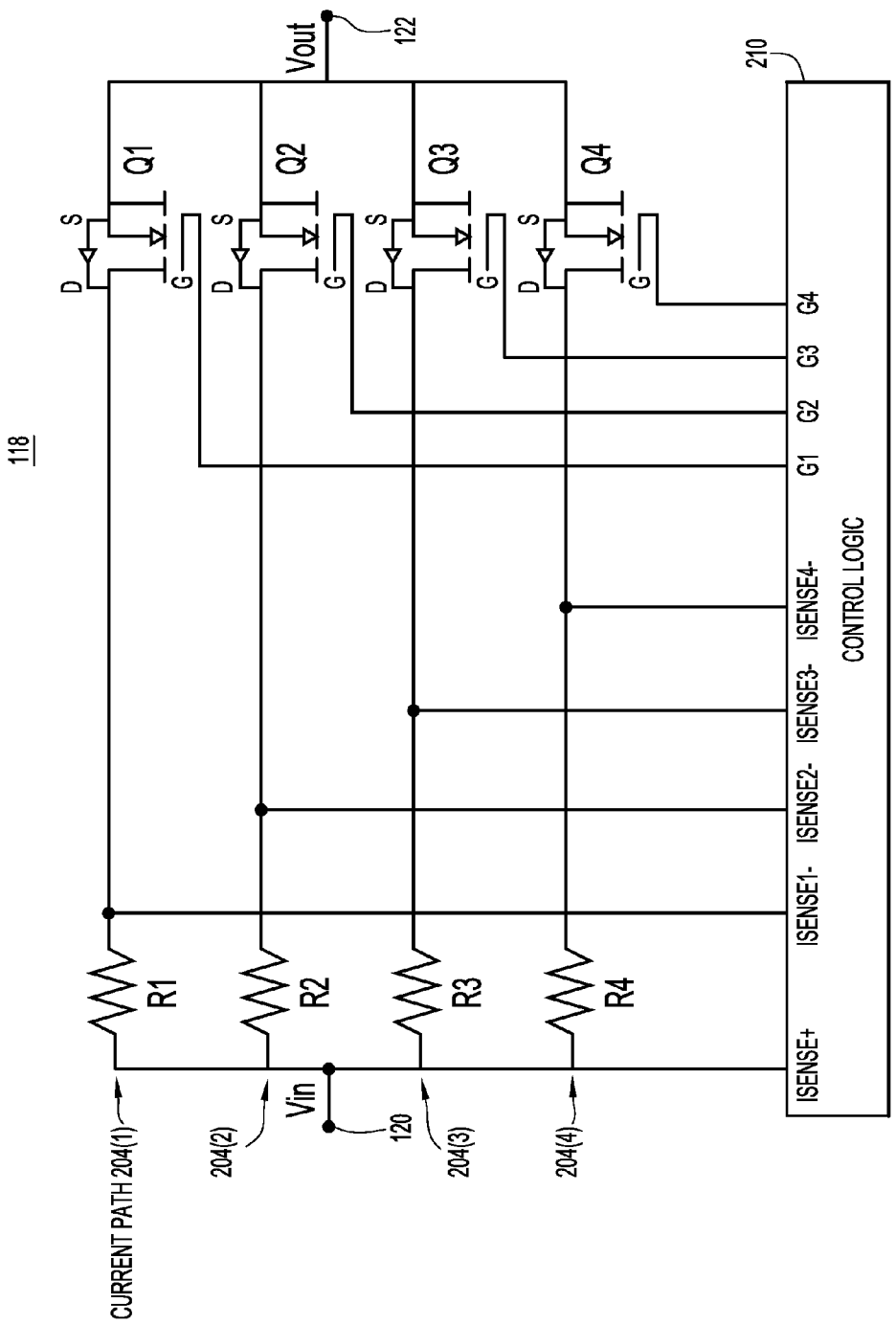
FIG. 2 is a circuit diagram of the hot swap controller in FIG. 1, according to a first embodiment of the hot swap controller.

With reference to FIG. 2, there is a circuit diagram of hot swap controller 118, according to a first embodiment. Hot swap controller 118 includes multiple current paths or channels 204(1)-204(4) connected in parallel with each other between input node 120 and power terminal 122. Although four parallel current paths are depicted in the example of FIG. 2, any practical number of parallel current paths greater than two may be used to safely handle expected inrush current, as described below. Hot swap controller 118 also includes control logic 210 coupled separately to each current path 204(i) to control the current flowing in each current path. Each current path 204(i) respectively includes (i) a current sense resistor Ri to provide a current sense output (collectively, voltages ISENSE+ and ISENSEi−) indicative of current in path 204(i), and (ii) a controllable current switch in the form of a MOSFET Qi (also referred to herein simply as a FET Qi) having a source-drain current path (also referred to simply as a "source-drain path") to control the current in the path responsive to a voltage Gi on a gate G of MOSFET Qi. More specifically, each sense resistor Ri includes a first end connected to input node 120 and a second end connected to a drain D of MOSFET Qi, while the source S of MOSFET Qi is connected to power rail 122, such that the sense resistor Ri and the source-drain path of MOSFET Qi are connected in series with each other between input node 120 and power rail 122.

Control logic 210 is separately/individually connected to the gate G of each MOSFET Qi so that the control logic is able to apply the gate voltage Gi derived thereby to each MOSFET Qi in order to control the current in the source-drain path of the MOSFET Qi (and thus in current path 204(i)). Control logic 210 is also connected in common to the first end of each resistor Ri (i.e., to input node 120) so as to receive a first sense voltage ISENSE+ that is common to all of the resistors. Additionally, control logic 210 is separately/individually connected to the second end of each sense resistor Ri (i.e., to the drain D of each MOSFET Qi) so as to receive respective ones of sense voltages ISENSEi– (e.g., voltages ISENSE1–, ISENSE2–, ISENSE3–, and ISENSE4–). In this way, control logic 210 is separately/individually connected to each sense resistor Ri so as to receive the respective current sense output, represented by the voltage pair ISENSE+, ISENSEi–, from that resistor Ri. When current path 204(i) conducts current, a voltage drop across resistor Ri given by the difference between voltages ISENSE+ and ISENSEi– indicates the level of current in the path (assuming a known resistance of Ri).

Figure 3:
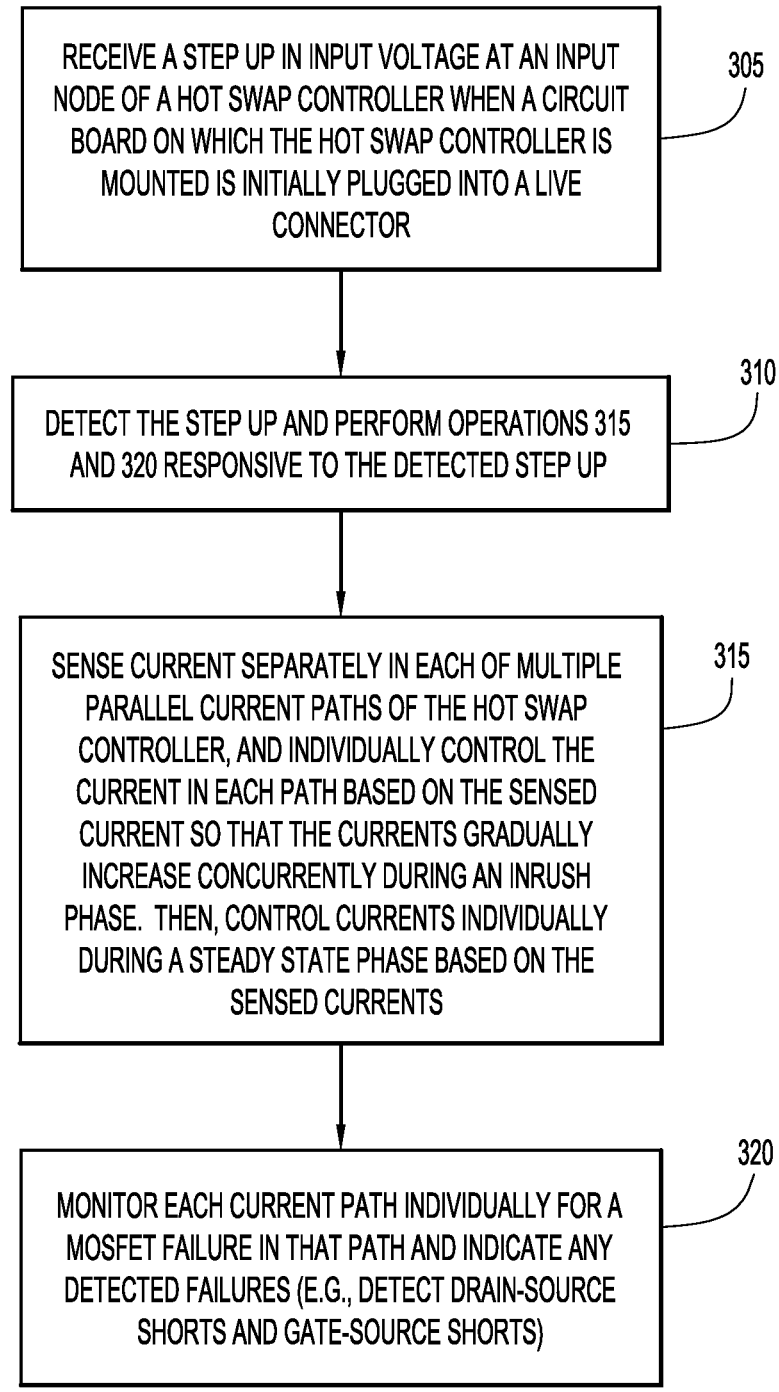
FIG. 3 is a flowchart of operations performed by the hot swap controller, according to an example embodiment.

With reference to FIG. 3, there is a flowchart of operations 300 performed by hot swap controller 118. Operations 300 are described with continued reference to FIGS. 1 and 2. It is assumed that initially circuit board 106 is not plugged into live chassis connector 110 and the voltages at input node 120 and power rail 122 of the circuit board are thus zero.

At 305, when circuit board 106 is initially plugged into live chassis connector 110, circuit input node 120 receives a relatively instantaneous step-up in voltage from zero volts to voltage Vin (e.g., 12V) supplied by mated connectors 110 and 112.

At 310, hot swap controller 118 (e.g., control logic 210) senses or detects the step-up in voltage at input node 120 and in response performs operations 315 and 320, described below. In another embodiment, hot swap controller 118 may be switched from a disabled state to an enabled state under control of external logic (not shown) to perform operations 315 and 320 after circuit board 106 is mated to chassis connector 110.

At 315, control logic 210 first charges gate G of each MOSFET Qi and then senses/determines the current in each path 204(i) individually based on sense output voltages ISENSE+, ISENSEi– for that path. Control logic 210 derives/generates each gate voltage Gi individually (i.e., separately from or independent of the other gate voltages) based on the individually sensed current for path 204(i) so as to control the current in the source-drain path of each MOSFET Qi individually (which thereby controls the current in each path 204(i) individually). Control logic 210 controls the current in each path 204(i) in this way so that all of paths 204 concurrently conduct current from input node 120 to power rail 122 to collectively cause a total inrush current at power rail 122 (i.e. the sum of the currents across all of paths 204) to gradually increase from zero to a total steady state current to eventually power circuit load 124 under steady state conditions. The gradual increase in total inrush current at power rail 122 causes a corresponding gradual increase in voltage Vout at the power rail from zero volts to near Vin. In an embodiment, control logic 210 controls the current in each path 204(i) individually so that the currents in all of paths 204 concurrently gradually increase from zero to their respective steady state currents that contribute to the total steady state current (and steady state voltage) at power rail 122. The period of time during which controller 210 gradually increases the currents in paths 204 after plug-in is referred to as the "inrush phase" and the time period following inrush phase during which the controller maintains the currents at a relatively constant level is referred to as the "steady state phase."

During both the inrush phase and steady state phases, control logic 210 may balance the currents in paths 204 with respect to one another according to a predetermined criterion. For example, controller 210 may generate gate voltages Gi so that the currents in paths 204 are substantially equal to each other at any given time. During the inrush phase, control logic 210 may generate gate voltages Gi so that the currents in each 204(i) follow a common predetermined desired current vs. time curve stored in control logic 210, as depicted in FIG. 4A, for example.

Figure 4A:
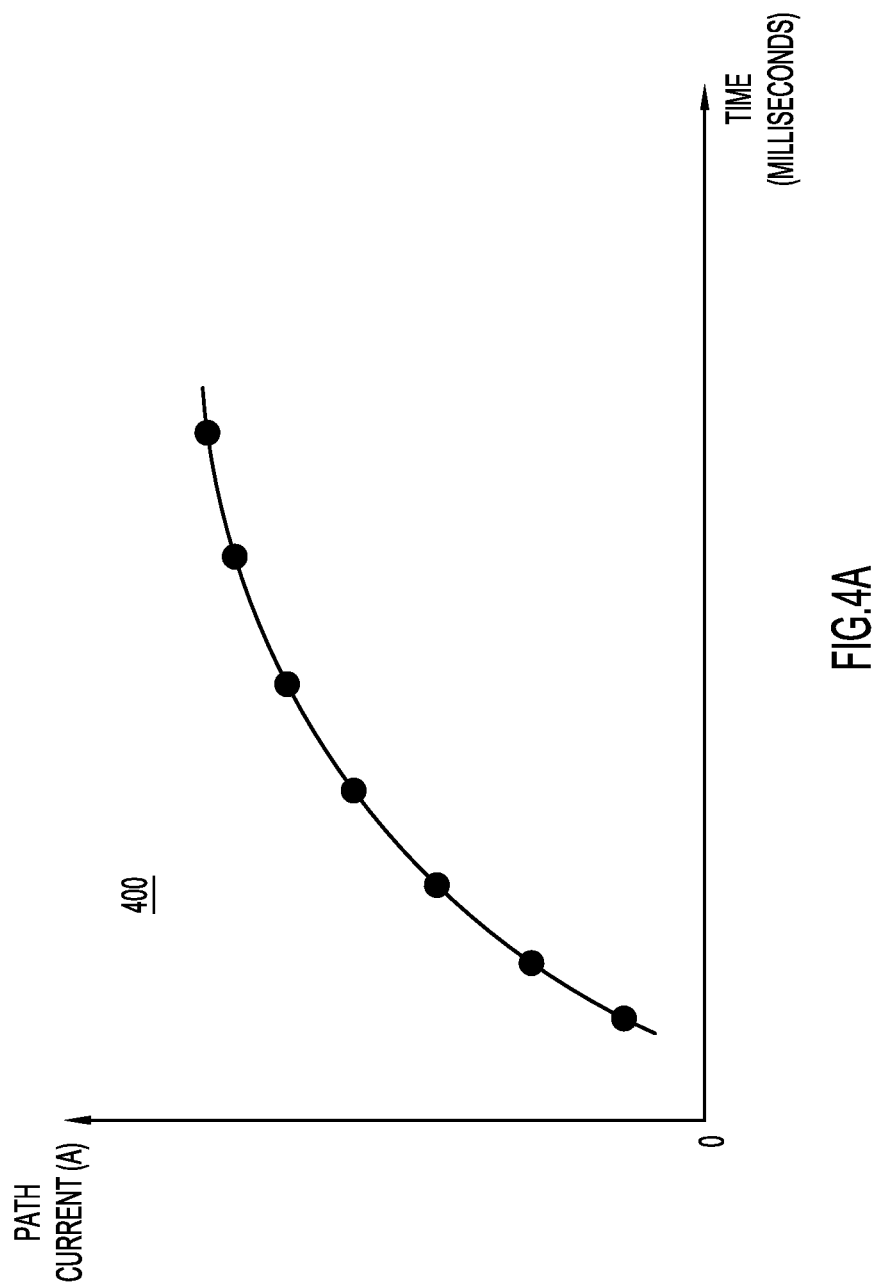
FIG. 4A is an illustration of an plot of desired path current vs. time used by control logic of the hot swap controller to control current in multiple current paths of the hot swap controller, individually, according to an example embodiment.

With reference to FIG. 4A, there is an illustration of an example plot 400 of desired current (in Amps (A)) vs. time (in milliseconds (ms)) referenced by controller 210 to control the current in each path 204(i) during the inrush phase. Plot 400 may be stored in memory of control logic 210 as a table in which each row thereof includes a "time, desired current" pair corresponding to a point on plot 400. During the inrush phase, control logic 410 periodically senses the current in each path 204(i) (e.g., every millisecond), accesses a desired current for that time from plot 400 (or row in a table thereof), and, if necessary, adjusts the current in that path to match the desired current. For example, if the sensed current in path 204(i) is less than or greater than the desired current accessed from plot 400 for a given instant in time, control logic 210 increases or decreases gate voltage Gi and thereby increases or decreases the actual current to drive it closer to the desired current. In an alternative embodiment, control logic 210 may generate the desired current in real-time based on an equation for the desired current as a function of time.

Returning to FIG. 3, at 320, control logic 210 monitors MOSFETs Q1-Q4 for failures, individually. That is, control logic 210 detects failures in the MOSFETs, individually. Such failures include drain-source shorts and gate-source shorts in MOSFETs Q1-Q4. Control logic 210 may detect failures in MOSFETs Q1-Q4 individually during the inrush phase, the steady state phase, or both.

To detect a gate-source short on a given MOSFET Qi, over time control logic 210 monitors the gate voltage Gi on MOSFET Qi, which should be non-zero after control logic 210 has charged gate G of MOSFET Qi in the absence of a gate-source short. If the monitored gate voltage Gi remains zero for a predetermine time period (e.g., 1 second), control logic 210 asserts a fault flag indicating that MOSFET Qi has a gate-source short failure (e.g., declares a gate-source failure for MOSFET Qi).

To detect a drain-source short on a given MOSFET Qi, control logic 210 drives gate voltage Gi to a level to turn-off MOSFET Qi for a predetermined time period (e.g., 500 ms) and, while MOSFET Qi is turned off, senses/determines the current in path 204(i), which should be zero in the absence of a drain-source short in MOSFET Qi. If the sensed current in path 204(i) is non-zero while MOSFET Qi is turned off, control logic 210 asserts a fault flag indicating that MOSFET Qi has a drain-source short (e.g., declares a drain-source failure for MOSFET Qi). Control logic 210 may sequentially turn off MOSFETs Q1-Q4 and perform the test for a source-drain short on each MOSFET in turn.

To detect a drain-source break or open circuit on a given MOSFET Qi, control logic 210 drives gate voltage Gi to a level to turn-on MOSFET Qi for a predetermined time period (e.g., 500 ms) and, while MOSFET Qi is turned on, senses/determines the current in path 204(i), which should be none-zero in the absence of a drain-source break in MOSFET Qi. If the sensed current in path 204(i) is near zero while MOSFET Qi is turned on, control logic 210 asserts a fault flag indicating that MOSFET Qi has a drain-source break (e.g., declares a drain-source failure for MOSFET Qi). A near zero current is a current that is a small fraction of the expected current in MOSFET Qi, and may be a current less than a milliamp, for example. Control logic 210 may sequentially turn on MOSFETs Q1-Q4 and perform the test for a source-drain break on each MOSFET in turn.

Figure 4B:
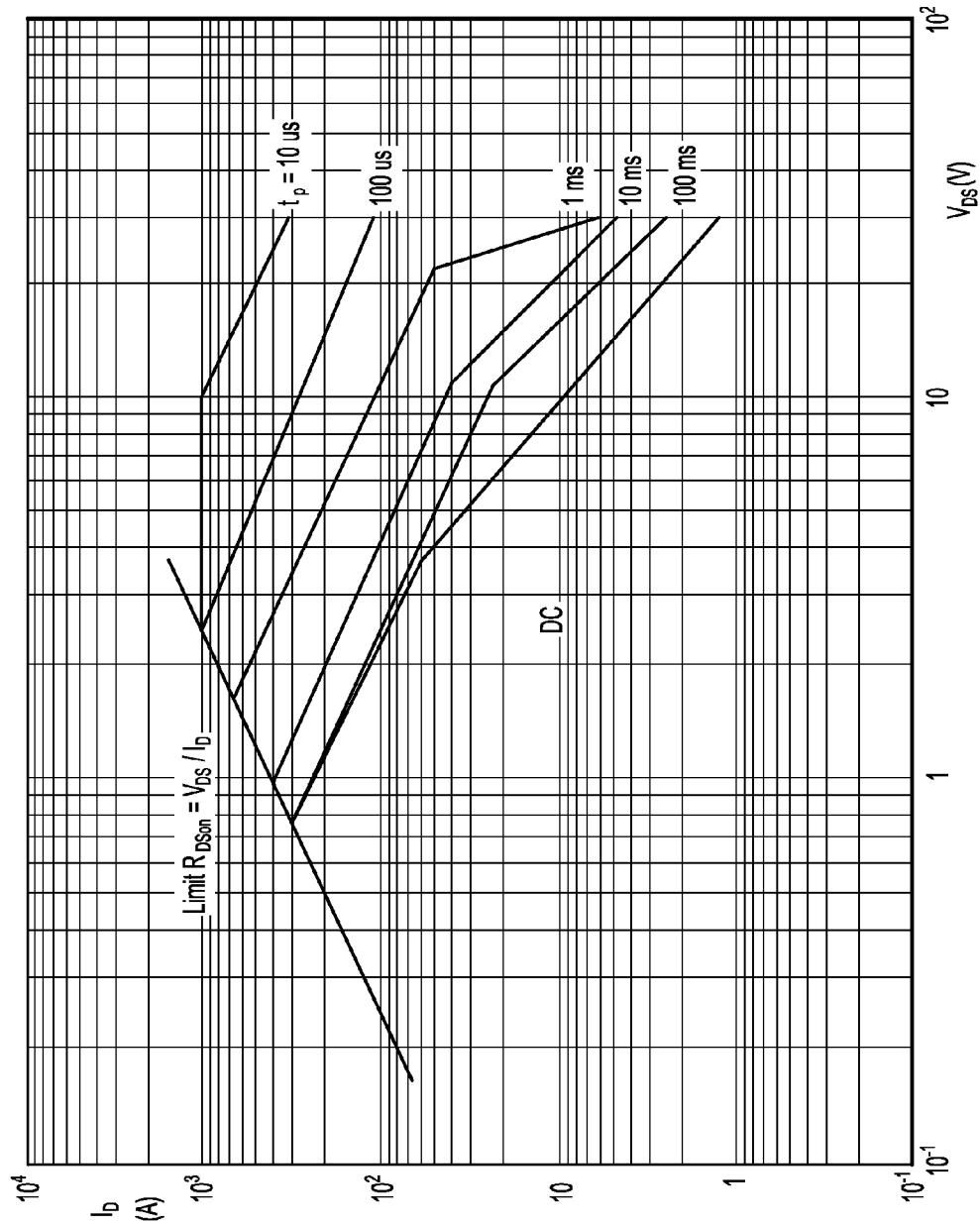
FIG. 4B is an illustration of an safe operation area curve that plots continuous and peak drain currents for a MOSFET as a function of a drain-source voltage, according to an example embodiment.

In an example application for hot swap controller 118, input node 120 receives a voltage Vin equal to 12V and the 4 MOSFETs consumes approximately 1000 W if the inrush current reaches about 83 A. Multiple, concurrently conducting, parallel current paths 204(1)-204(4) reduce the maximal conducting currents in the MOSFETs, which cooperate to share or divide the 83 A current load across the current paths and ensure that MOSFETs Q1-Q4 will each operate in accordance with a safe operating area (SOA) curve for the type of MOSFET in use. The number of parallel current paths and the type of MOSFET used in each path (which define the SOA for the MOSFET and its other operating parameters) are selected to keep the MOSFETs operating safely under the SOA curve. With reference to FIG. 4B, there is an illustration of an SOA curve 420 that plots continuous and peak drain currents $I_D$ (in Amps) as a function of a drain-source voltage $V_{DS}$ for an example MOSFET.

In an arrangement of a hot swap controller in which all of the gates of the MOSFETs are connected together (not shown or described herein), a common gate voltage necessarily drives the gates of all of the MOSFETs. Under practical conditions in which the MOSFETs have different $V_{GS}$ thresholds (e.g., due to process variation) used to turn on the MOSFETs, and given that at any time it is possible the common gate voltage applied to all of the gates may be just above what is erroneously assumed to be the a common $V_{GS}$ threshold for all of the MOSFETs, it is likely that only one of the parallel MOSFETs will actually turn on, i.e., only the MOSFET with the lowest $V_{GS}$ will turn on first before the other MOSFETs. In this case, that one MOSFET will dissipate 100% of the power during the inrush phase. For example, given an inrush current limit of 8 A, a voltage Vin equal to 12V, and that a voltage rise time or ramp-up is 10 ms, then a minimal SOA for each MOSFET corresponds to 8 A*12V=96 W for 10 ms. Thus, large package MOSFETs with individually high SOA performance must be selected so that each MOSFET can handle the full inrush environment.

The individualized control of gate voltages Gi afforded in the hot swap controller embodiments described herein advantageously reduces the minimum SOA requirements for the MOSFETs relative to an arrangement in which the gate voltages are driven in common. Specifically, hot swap controller 118 controls the current in each path 204(i) to ensure that all FETs Q1-Q4 are concurrently conducting based on sensed current in each current path and individualized control of each gate voltage Gi, which avoids a situation in which only one FET is conducting at any given time. Accordingly, the SOA requirement can be reduced by ¼ (assuming 4 current paths) relative to the SOA requirement in an arrangement that does not have individualized control. For example, each MOSFET Qi can be assumed to conduct 2 A (instead of 8 A) and the SOA requirement correspondingly drops to 2 A*12 V=24 W for 10 ms. Accordingly, small package MOSFETs with individually low SOA performance may be selected. A lower MOSFET SOA requirement/performance translates to a lower cost MOSFET package that dissipates less power.

Another advantage of being able to ensure that all of the MOSFETs are conducting concurrently is that the inrush current may be gradually increased or ramped-up at a rate that is faster (i.e., that has a steeper slope) than with an arrangement in which only one MOSFET is conducting at any given time. The faster ramp-up advantageously translates to a correspondingly shorter inrush phase, which is desirable. In an example in which each MOSFET Qi handles 8 A of inrush current concurrently with the other MOSFETs, the total inrush current may be as high as 32 A.

Figure 5:
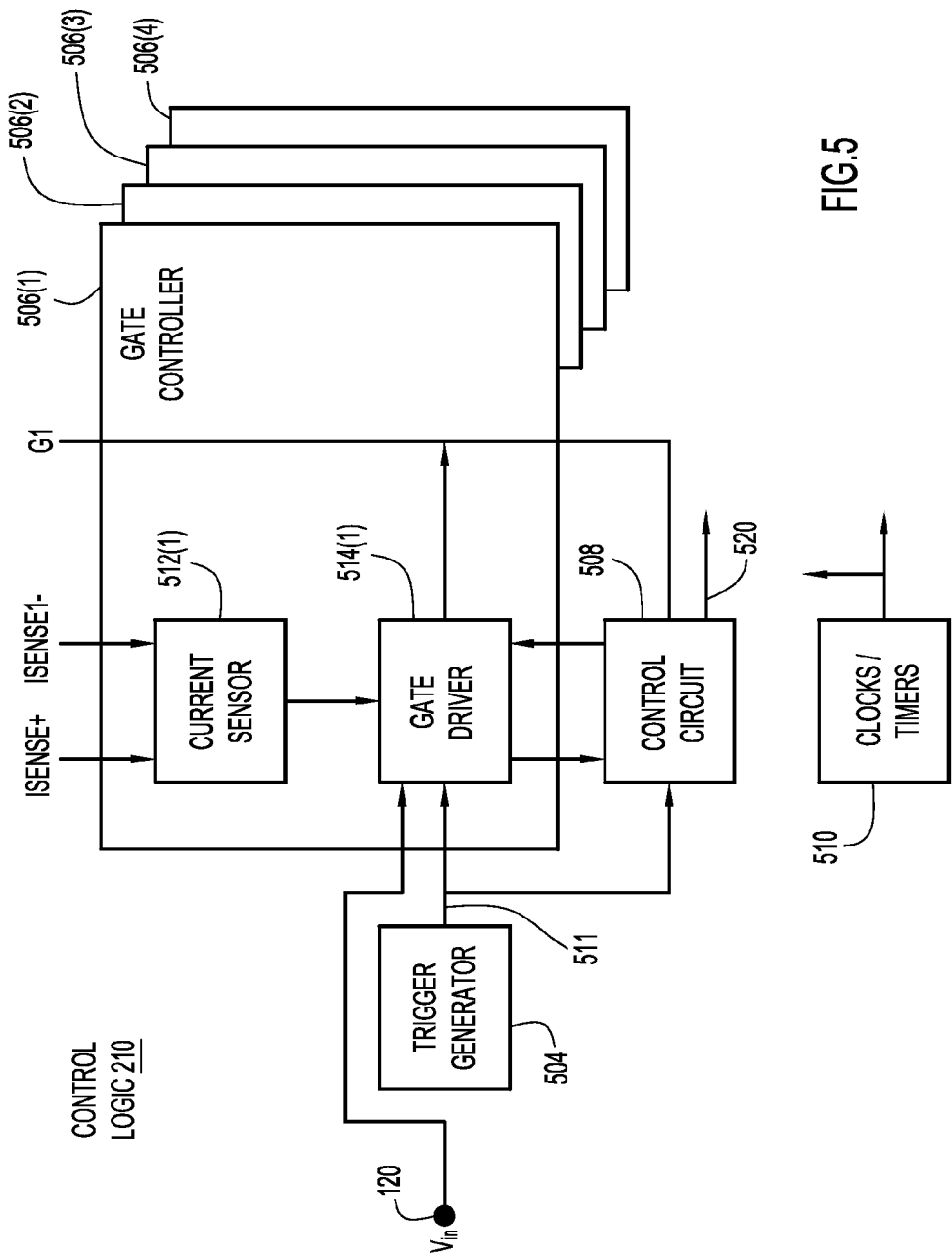
FIG. 5 is a block diagram of control logic of the hot swap controller, according to an example embodiment.

With reference to FIG. 5, there is a block diagram of control logic 210, according to an embodiment. Control logic includes a trigger generator 504 coupled to input node 120, multiple gate controllers 506(1)-506(4) each coupled to the trigger generator, a control circuit 508 coupled to the trigger generator and each of the multiple gate controllers, and clock/timer circuit 510 to provide clock and timer signals to each of the other components of control logic 210. Trigger generator 504 detects a step-up in the voltage at input node 120 when circuit board 106 is initially plugged into chassis 104, to produce a trigger signal 511 that is provided to each gate controller 506(i) and control circuit 508. Trigger signal 511 triggers/enables operations in control logic 210 during the inrush phase.

Each gate controller 506(i) is individually coupled to and individually controls corresponding current path 204(i). Accordingly, each gate controller 506(i) respectively includes a current sensor 512(i) to receive respective sense output voltages ISENSE+, ISENSEi− and sense current in current path 204(i) based on the sense output. Each gate controller 506(i) respectively includes a gate driver 514(i) to generate gate voltage Gi based on the current sensed in path 206(i) as described above and provides the gate voltage Gi to the gate G of MOSFET Qi. Each gate driver 514(i) may include a respective charge pump, for example, to generate gate voltage Gi under control of trigger signal 511 and control circuit 508. Current sensor 512(i) and gate controller 506(i) interact with each other to effect the operations described above.

Control circuit 508 includes memory (not specifically shown in FIG. 5) to store information, including one or more desired current vs. time plots and/or equations as described above in connection with FIG. 4A. Control circuit 508 implements MOSFET failure detect sequences and generates failure flags/signals 520 that indicate which of MOSFETs Q1-Q4 have failed, if any. Control circuit 508 uses clocks and time signals generated by clock/timer circuit 510 to implement the predetermined time periods mentioned above.

Control logic 210 may be implemented as analog circuits, digital circuits, microcontrollers/processors or a combination thereof. Also, memory in control circuit 508 may store logic instructions that, when executed by a microcontroller/processor of control logic 210, perform or assist in the performance of the operations described herein, as would be understood by one of ordinary skill in the relevant arts having read the present description.

Figure 6A:
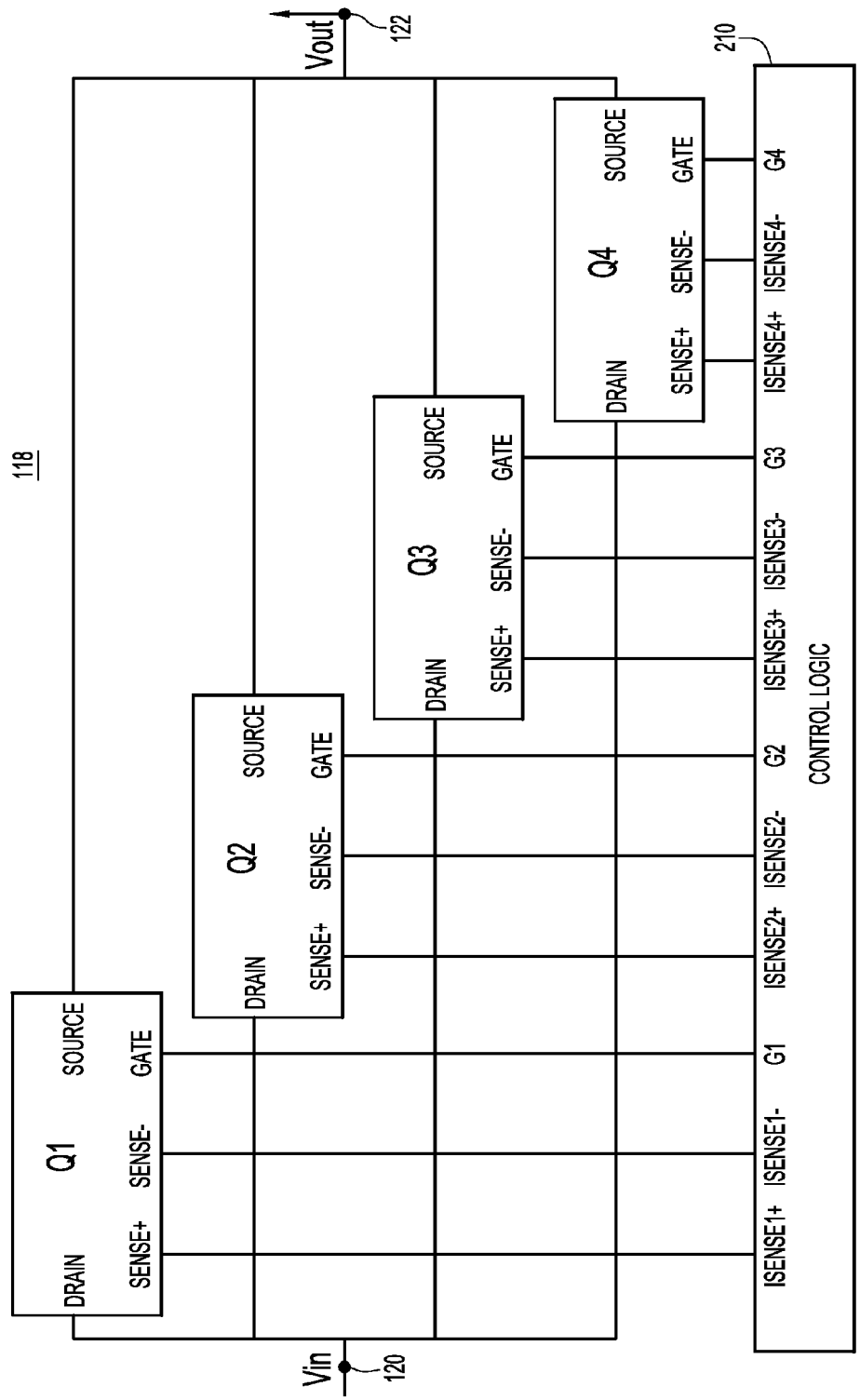
FIG. 6A is a block diagram of the hot swap controller of FIG. 1, according to a second embodiment of the hot swap controller.

With reference to FIG. 6A, there is depicted a block diagram of hot swap controller 118, according to a second embodiment. In the embodiment of FIG. 6A, each of MOSFETs Qi is packaged to integrate an embedded current sense circuit with the MOSFET, which omits the current sense resistors depicted in the embodiment of FIG. 2 and their attendant power losses. In the embodiment of FIG. 6A, control logic 210 receives a respective sense output (collectively, voltages ISENSE+, ISENSE−) directly from each MOSFET Qi (where each pair of voltages ISENSE+, ISENSE− respectively correspond to one of the pairs of voltages ISENSEi+, ISENSEi−). In some embodiments, the MOSFETs may only have one output pin to represent the current in the MOSFET, such as a current source output.

Figure 6B:
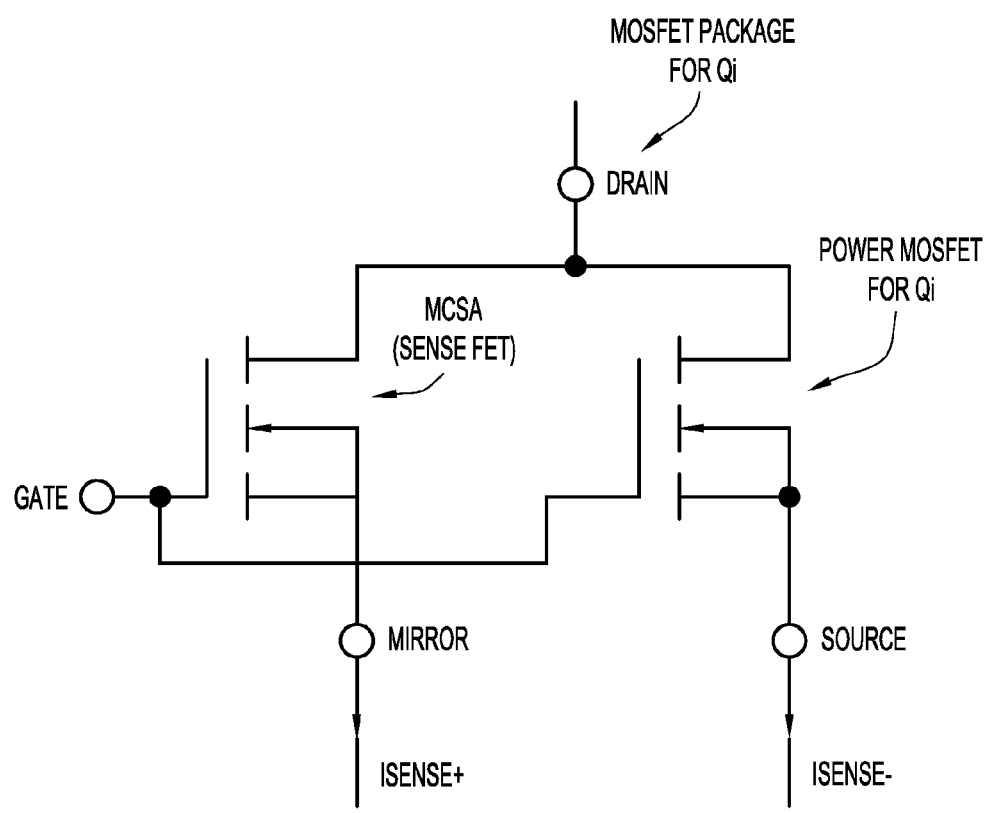
FIG. 6B there is circuit diagram of a MOSFET packaged to integrate an embedded current sense circuit, according to an example embodiment.

With reference to FIG. 6B there is circuit diagram of an example MOSFET package for MOSFET Qi that integrates a main or primary power MOSFET with an embedded current sense circuit (labeled "MCSA") that is paired with the power MOSFET. In the example of FIG. 6B, the voltage ISENSE+ for the power MOSFET may be provided from a tap connected to a mirror current sense amplifier (i.e., a sense FET) MCSA packaged with the power MOSFET and the voltage ISENSE− may be provided from a tap connected to the source S of the power MOSFET. Thus, the voltages ISENSE+, ISENSE− together indicate the source-drain current in the MOSFET. That being the case, control logic 210 may translate the sensed gate-source voltage indicated by voltages SENSE+, SENSE− to a source-drain current based on a transfer curve or plot of gate-source voltage vs. drain-source current. Such a transfer curve may be stored in control circuit 508. Thus, the embodiment of FIG. 6B provides the current sense output without sense resistors.

The connections of the sense outputs from each MOSFET Qi to control circuit 210 may be implemented in any number of different ways that include the use of one sense pin for each MOSFET Qi, a configuration in which all of the positive sense pins are connected together, or a configuration in which all of the negative sense pins are connected together. Control logic 210 may use a dedicated gate control pin for each MOSFET Qi to keep independent control of the multiple current paths. It is also possible to have 2 gate drive pins and 2 current input pins that control the 4 MOSFETs depicted in FIG. 7. To do this, the 4 current paths are grouped into 2 groups, each having 2 MOSFETs and 1 or 2 sense resistors. But only one gate drive pin to control each group's MOSFETs.

Figure 7:
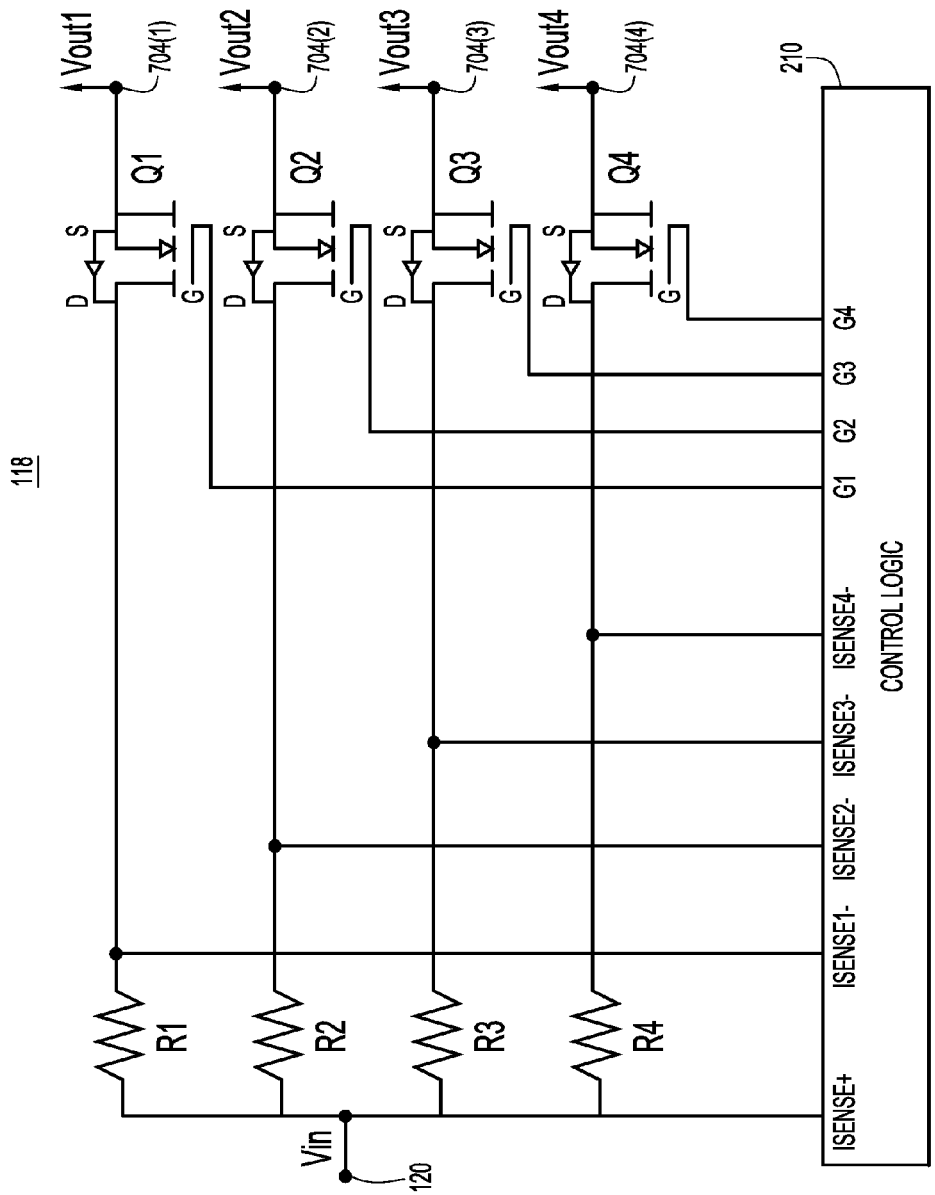
FIG. 7 is a block diagram of the hot swap controller of FIG. 1, according to a third embodiment of the hot swap controller.

With reference to FIG. 7, there is depicted a block diagram of hot swap controller 118, according to a third embodiment. The embodiment of FIG. 7 is similar to the embodiment of FIG. 2, except that the source S of each MOSFET Qi is not connected to common output node 122. Instead, the source of each MOSFET Qi is connected to a respective one of multiple power rails 704(1)-704(4), which are electrically isolated from each other. Each power rail 704(i) is connected to a separate circuit load (not shown in FIG. 7), which is thus supplied with power only through corresponding MOSFET Qi. During the steady state phase, each power rail 704(i) applies a corresponding one of separate voltages Vout1, Vout2, Vout3, and Vout4, each near the voltage Vin, to the corresponding circuit load.

In summary, in one form, an apparatus is provided comprising: an input node; a power rail to power a circuit load; multiple current paths coupled in parallel with each other between the input node and the power rail, each current path respectively providing a sense output to indicate current in the path and including a current switch having a control input to control the current; and a control circuit coupled to each control input individually and to each sense output individually, the control circuit configured to control the current in each path individually based on the indicated current therein after a non-zero input voltage is initially applied to the input node, such that all of the paths concurrently conduct current from the input node to the power rail and collectively cause a total inrush current and corresponding voltage at the power rail to gradually increase.

In another form, an apparatus is provided comprising an input node; multiple power rails each to power a respective one of multiple circuit loads; multiple current paths each coupled between the input node and a respective one of the multiple power rails, each current path respectively including a sense output to indicate current in the path and a field effect transistor (FET) having a source-drain path to control the current in the path responsive to a voltage applied to a gate of the FET; and a control circuit coupled to each gate individually and to each sense circuit individually, the control circuit configured to control the current in each path individually based on the indicated current therein after a non-zero input voltage is initially applied to the input node, such that all of the paths concurrently conduct current from the input node to the power rail to cause an inrush current and corresponding voltage at the respective power rail to gradually increase.

In yet another form, a method is provided comprising: in hot swap controller including an input node, a power rail coupled to a circuit load, and multiple current paths coupled in parallel with each other between the input node and the power rail, each current path respectively including a sense output to indicate current in the path and a current switch having a control input to control the current in the path; and receiving a step-up in voltage from a zero potential to a non-zero potential at the input node and, responsive to the step-up in voltage: sensing current in each of the current paths individually; and controlling the current in each path individually based on the current sensed therein, to cause all of the paths to concurrently conduct current from the input node to the power rail and collectively cause an inrush current and corresponding voltage at the power rail to gradually increase.

The above description is intended by way of example only. Various modifications and structural changes may be made therein without departing from the scope of the concepts described herein and within the scope and range of equivalents of the claims.

What is claimed is:

1. An apparatus comprising:
   an input node;
   a power rail to power a circuit load;
   multiple current paths coupled in parallel with each other between the input node and the power rail, each current path respectively providing a sense output to indicate current in the path and including a current switch having a control input to control the current; and
   a control circuit coupled to each control input individually and to each sense output individually, the control circuit configured to store data representing a curve that defines a gradually increasing desired current vs. time, periodically sense the current in each path, access a desired current defined by the data representing the curve corresponding to a time when the current is sensed, and adjust the current to match the desired current for the corresponding time, so as to control the current in each path individually based on the indicated current therein after a non-zero input voltage is initially applied to the input node, such that all of the paths concurrently conduct current from the input node to the power rail and collectively cause a total inrush current and corresponding voltage at the power rail to gradually increase.

2. The apparatus of claim 1, wherein the control circuit is further configured to control the current in each path individually so that all of the currents gradually increase from zero to respective steady state currents concurrently and the inrush current and voltage at the power rail correspondingly gradually increase from zero to a steady state current and a steady state voltage near the non-zero input voltage to power the circuit load.

3. The apparatus of claim 2, wherein the control circuit is further configured to control the current in each path individually so as to balance the currents relative to each other in accordance with a predetermined criterion.

4. The apparatus of claim 3, wherein the predetermined balance criterion is that all of the currents in the paths are to be substantially the same while gradually increased.

5. The apparatus of claim 1, wherein:
each current switch includes a respective field effect transistor (FET) having a source-drain path coupled between the input node and the power rail, and a gate to serve as the control input; and
the control circuit provides a respective one of multiple control voltages to the gate of each of the FETs to control the current through each of the FET source-drain paths individually.

6. The apparatus of claim 5, wherein:
the control circuit is configured to provide different control voltages to the gates of the FETs to ensure the FETs conduct current concurrently.

7. The apparatus of claim 5, wherein the control circuit is further configured to detect failures in the FETs individually after the non-zero input voltage is applied to the input node.

8. The apparatus of claim 7, wherein to detect FET gate-source short failures, the control circuit is configured to:
monitor the gate voltage on each FET over time; and
if the monitored gate voltage on a given FET remains zero for a predetermine time period, declare that the given FET has a gate-source short failure.

9. The apparatus of claim 7, wherein to detect FET source-drain short failures, the control circuit is configured to:
turn-off the FETs individually; and
if the indicated current in the path in which a given FET that is turned-off is non-zero, declare that the given FET has a drain-source failure.

10. The apparatus of claim 7, wherein to detect FET source-drain break failures, the control circuit is configured to:
turn-on the FETs individually; and
if the indicated current in the path in which a given FET that is turned-on is near zero, declare that the given FET has a drain-source failure.

11. The apparatus of claim 5, wherein:
each path respectively includes a sense resistor connected in series with the FET between the input node and the output power rail, such that a first end of the resistor is connected to the input node, a second end of the resistor is connected to the FET, and a voltage across the first end and the second end represents the sense output to indicate the current in the current path; and
the control circuit includes a single first sense input coupled to the input node and in common to the first ends of the sense resistors, the control circuit having multiple second sense inputs connected individually to respective ones of the second ends of the sense resistors.

12. The apparatus of claim 5, further comprising:
a respective sense FET paired with each respective FET, each sense FET to mirror the current in the respective FET, wherein the sense output includes a first tap on a source of the sense FET and a second tap on a source of the respective FET.

13. The apparatus of claim 1, further comprising:
a circuit board including a circuit board connector to mate with a complimentary connector of a chassis to retain the circuit board, the circuit board connector including power pins to receive power from complimentary power pins of the chassis connector, and wherein:
the circuit load includes circuitry on the circuit board; and
the input node, the power rail, the multiple current paths, and the control circuit collectively comprise a hot swap controller on the circuit board, and the input node is connected to at least one of the power pins of the circuit board connector to receive power from the at least one of the power pins when the circuit board and chassis connectors are mated.

14. The apparatus of claim 13, further comprising a trigger circuit to detect the non-zero input voltage initially applied to the input node when the circuit board is initially mated to the chassis, and to produce a trigger signal when the non-zero voltage is detected, wherein the control circuit is configured to perform the control of the current in each path individually responsive to the trigger signal.

15. The apparatus of claim 1, wherein the control circuit is configured to store the curve as a series of points each defined by a "desired current, time" pair, and the control circuit is further configured to: when the sensed current is less than or greater than the desired current, increase or decrease the current do drive the current closer to the desired current.

16. A method comprising:
in hot swap controller including an input node, a power rail coupled to a circuit load, and multiple current paths coupled in parallel with each other between the input node and the power rail, each current path respectively including a sense output to indicate current in the path and a current switch having a control input to control the current in the path;
storing data representing a curve that defines a gradually increasing desired current vs. time; and
receiving a step-up in voltage from a zero potential to a non-zero potential at the input node and, responsive to the step-up in voltage, periodically:
sensing current in each of the current paths individually;
accessing a desired current defined by the data representing the curve corresponding to a time when the current is sensed; and
adjusting the current to match the desired current for the corresponding time such that the adjusting results in controlling the current in each path individually based on the current sensed therein, to cause all of the paths to concurrently conduct current from the input node to the power rail and collectively cause an inrush current and corresponding voltage at the power rail to gradually increase.

17. The method of claim 16, wherein the controlling includes controlling the current in each path individually so that all of the currents gradually increase from zero to respective steady state currents concurrently and the inrush current and corresponding voltage at the power rail correspondingly gradually increase from zero to a steady state current and a steady state voltage, respectively, to power the circuit load.

18. The method of claim 17, wherein the controlling includes controlling the current in each path individually so as to balance the currents relative to each other in accordance with a predetermined criterion.

19. The method of claim 16, wherein the controlling includes controlling the current so that all of the currents in the paths are substantially the same while gradually increased.

20. The method of claim 16, wherein each current switch includes a field effect transistor (FET), the method further comprising detecting failures in each of the FETs individually.

* * * * *